Patented July 14, 1931

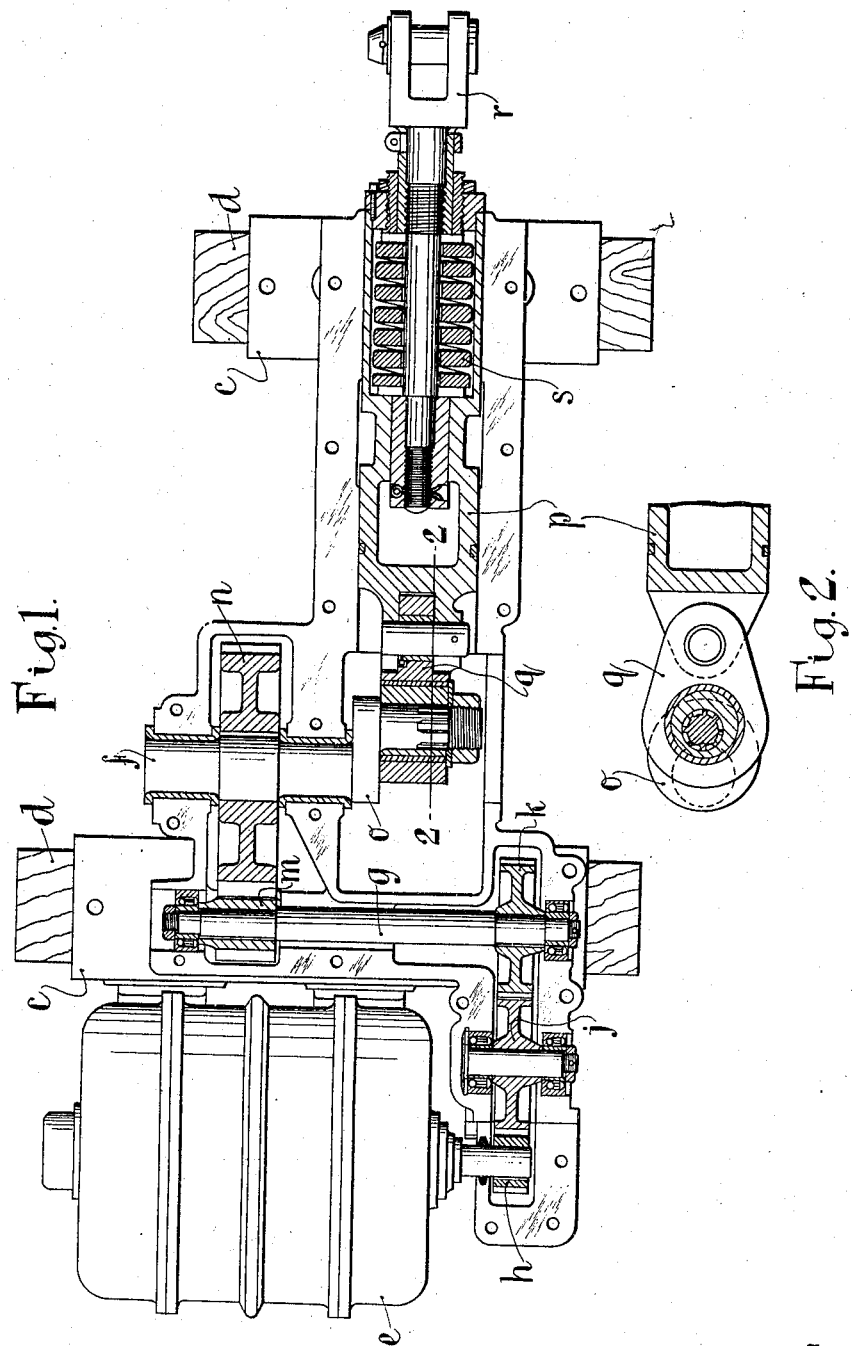

1,814,732

UNITED STATES PATENT OFFICE

TAGE GEORG NYBORG AND MARK FREDERICK HIGGINS, OF WORCESTER, ENGLAND

ELECTRICALLY DRIVEN SHAKER CONVEYER

Original application filed February 17, 1927, Serial No. 169,117, and in Great Britain September 15, 1926. Divided and this application filed May 28, 1928. Serial No. 281,321.

This application is a division of my application for electrically driven shaker conveyers filed 17th February 1927, Serial No. 169,117.

This invention relates to electrically driven shaker conveyers and has for its object to provide a driving unit suitable for underground conditions and adapted for the various conditions to be met with in thin seams.

A driving unit for conveyers of the kind referred to made in accordance with this invention is so constructed that when assembled the unit is capable of being turned over so that it can be used as a right hand or left hand drive without alteration.

Preferably the reciprocating motion is produced by a crank driving a crosshead by means of the connecting rod and pin, the crosshead transmitting its motion to a second crosshead by means of a double acting spring. The crank shaft may be driven by gear wheel reducing gear from a motor mounted on the housing of the unit. All the gearing is preferably totally enclosed and running in oil bath. The crank may be arranged for adjustable stroke.

Referring to the accompanying drawings:—

Fig. 1 is a part sectional plan with one half of the housing removed.

Fig. 2 is a sectional view of the detail illustrating the means for adjusting the crank.

The housing of the unit is formed in two parts and substantially symmetrically about the longitudinal axis of the unit so that when one portion of the housing is removed all parts are readily accessible.

The housing is cast with channel formed supports $c$ to rest on a hard floor or on wooden beams $d$ if found necessary on soft floors.

An electric motor $e$ is mounted at one end of the housing and is adapted to drive the crank shaft $f$ through counter shaft $g$ and gear wheels $h$, $j$, $k$, $m$, $n$. The crank $o$ reciprocates the crosshead $p$ by means of a connecting rod $q$ which transmits its motion to a second crosshead $r$ by means of a double acting spring $s$.

As appears from the drawings a very short connecting rod is used. By using a simple crank motion with the very short connecting rod $a$, a high acceleration is produced at the one end of the stroke and a smaller acceleration at the other end of the stroke. As the pressure in the direction of the stroke is in proportion to the acceleration, by introducing the adjustable double action spring $s$ in the sliding crosshead $p$, we adjust the spring $s$ so that the initial pressure of the spring $s$ is larger than the pressure due to the acceleration at the one end but smaller than the acceleration at the other end.

By this means the spring $s$ will not give at the end of the stroke with the smaller acceleration but only at the end with the larger acceleration under ordinary running, but if any mechanical shocks occur the spring $s$ will act as a buffer in both directions.

As the acceleration due to the short connecting rod is larger at the one end of the stroke, than at the other, the pressure tending to compress the spring is also larger at the one end of the stroke than at the other end. If the initial pressure of the spring is larger than the pressure due to the pressure at the end with the smaller acceleration, but smaller than the pressure due to the acceleration at the other end, it follows that the spring will not be compressed at the end of the stroke with the smaller acceleration and it cannot therefore make any alteration to the acceleration of the trough as this must follow the acceleration given by the crank and connecting rod.

At the other end with the larger acceleration the spring will be compressed as soon as the pressure due to the acceleration exceeds the initial pressure of the spring and thereby allows the trough to move further than due to the stroke of the crank. This means that the acceleration or retardation of the trough before finishing its stroke is delayed in respect of the acceleration due to the crank and connecting rod, but at the beginning of the return stroke it is increased correspondingly.

What we claim and desire to secure by Letters Patent is:—

1. In a driving device for shaker conveyers, a driven shaft, a crank arm connected with said shaft, a cross head, a connecting rod connecting said crank arm and cross head, a coupling member for connection with a shaker conveyer, said cross head slidable relative to the coupling member in both directions, and a single spring disposed between said cross head and coupling member and opposing relative motion between the cross head and coupling member in both directions, thereby absorbing shocks and effecting changes in acceleration on both strokes.

2. In a driving device for shaker conveyers, a driven shaft, a single crank connected thereto having a pin, an eccentric connected to the pin, a cross head, a connecting rod connecting said eccentric and cross head, a coupling member for connection with the conveyer, and a single spring device disposed within the cross head and between it and the coupling member, opposing the motion of the conveyer in both directions, thereby absorbing the shocks and effecting small acceleration on the forward stroke, and a larger followed by a smaller acceleration on the return stroke.

3. In a driving device for shaker conveyers, a driven shaft, a single crank connected thereto having a pin, an eccentric connected to the pin, a cross head, a connecting rod between one and one-half and two and one-half times the length of the crank connecting said eccentric and cross head, a coupling member for connection with the conveyer, and a single spring device disposed within the cross head and between it and the coupling member, opposing the motion of the conveyer in both directions, thereby absorbing shocks and effecting small acceleration on the forward stroke, and a larger followed by a smaller acceleration on the return stroke.

4. In a driving device for shaker conveyers, a driven shaft, a crank arm connected with said shaft, a cross head, a connecting rod connecting said crank arm and cross head, a coupling member for connection with a shaker conveyer, said cross head slidable relative to the coupling member in both directions, a single spring disposed between said cross head and coupling member and opposing relative motion between the cross head and coupling member in both directions and means for adjusting the spring so that it will yield to pressure due to predetermined accelerations, thereby absorbing shocks and effecting small accelerations on the forward stroke and a larger followed by a smaller acceleration on the return stroke.

5. In a driving device for shaker conveyers, a shaft, a crank arm fast to said shaft, a crank pin on said arm, a sliding cross head, an eccentric secured to said pin, a short connecting rod connecting said eccentric and cross head, a coupling member for connection with a shaker conveyer, said cross head slidable relative to the coupling member in both directions, and a single spring disposed between said cross head and coupling member and opposing relative motion between the cross head and coupling member in both directions, thereby absorbing shocks and effecting changes in acceleration on both strokes.

6. In a driving device for shaker conveyers, a driven shaft, a crank arm connected with said shaft, a cross head, a connecting rod connecting said crank arm and cross head, a coupling member for connection with a shaker conveyer, said cross head slidable relative to the coupling member in both directions, a single spring disposed between said cross head and coupling member and opposing relative motion between the cross head and coupling member in both directions, reducing gearing for driving the driven shaft, and means for adjusting the stroke of the crank arm.

7. In a driving device for shaker conveyers, a shaft, a crank on said shaft, a sliding cross head having an inner tubular recess, and an outer tubular recess communicating with and of larger diameter than said inner recess, a short connecting rod between said crank and cross head, a coupling spindle in said cross head having thereon a sleeve slidable in said recess of smaller diameter, a second sleeve secured to said spindle and slidable in a tubular bushing screw-threaded within the recessed portion of the cross head of larger diameter, and a spiral spring confined between said sleeves adapted to cushion the shocks due to movements of the cross head and other parts in both directions, and for increasing the acceleration.

In witness whereof we affix our signatures.

TAGE GEORG NYBORG.
MARK FREDERICK HIGGINS.